Jan. 10, 1956 R. L. HOYLE 2,730,193
SPARK ARRESTER SNUBBER
Filed Feb. 23, 1954

Inventor,
Robert L. Hoyle,
By: Jones, Jesch & Darbo, Attys.

United States Patent Office 2,730,193
Patented Jan. 10, 1956

2,730,193

SPARK ARRESTER SNUBBER

Robert L. Hoyle, Libertyville, Ill., assignor to Burgess-Manning Company, Libertyville, Ill., a corporation of Illinois Application February 23, 1954, Serial No. 411,915

3 Claims. (Cl. 183—87)

This invention relates to spark arrester snubbers and more particularly to diesel engine spark arresters which eliminate the emission of incandescent particles to the atmosphere, and, at the same time, smooth the flow of exhaust gases.

The principal object of the invention is to provide a spark arrester snubber which is a compact, efficient unit for smoothing the pulsating exhaust gases of locomotive or marine diesel installations and which will substantially completely remove the fire-hazardous incandescent carbon particles present in such exhaust gases before ejecting said gases to the atmosphere. The invention features novel means for directing the flow of a stream of gases entering a cylindrical shell at a side inlet into a helical path along the axis of the shell with minimum back pressure development for the centrifugal separation of particles entrained in the gas stream.

A further object of the invention is to provide a device which is simple and economical to fabricate and which has a high level of efficiency in terms of spark arrestance and pressure drop.

In the accompanying drawing—

Figure 1:
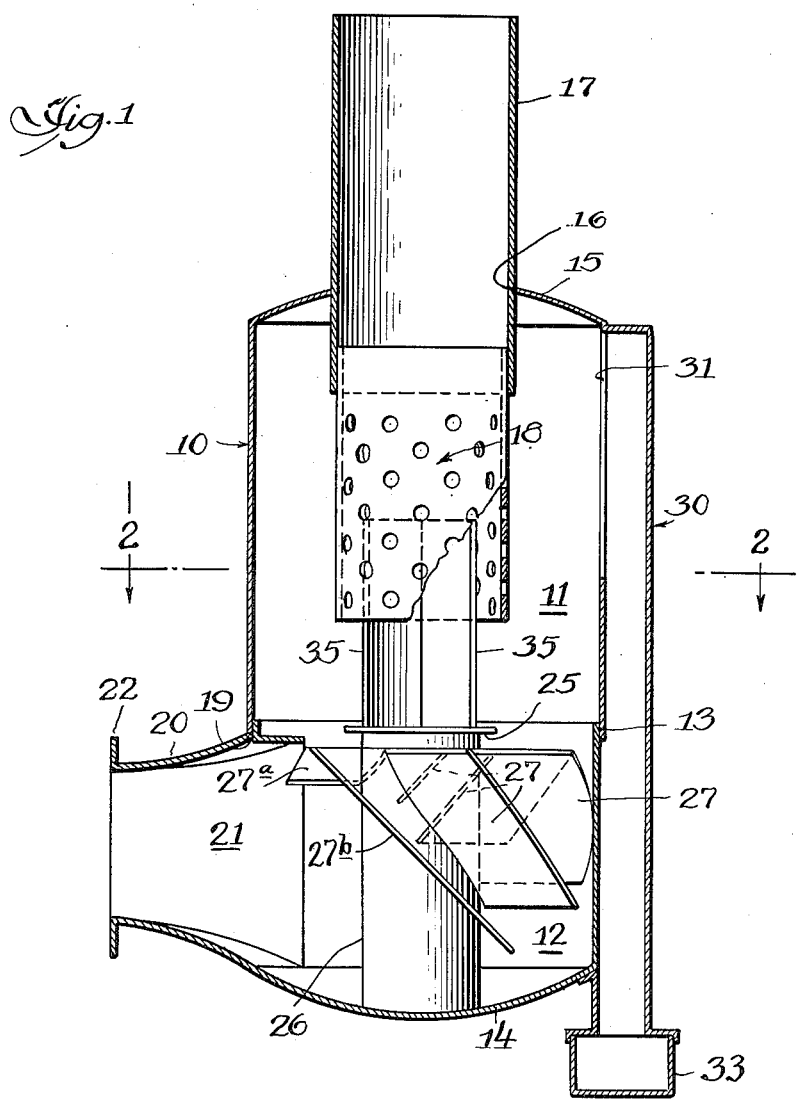
Figure 2:
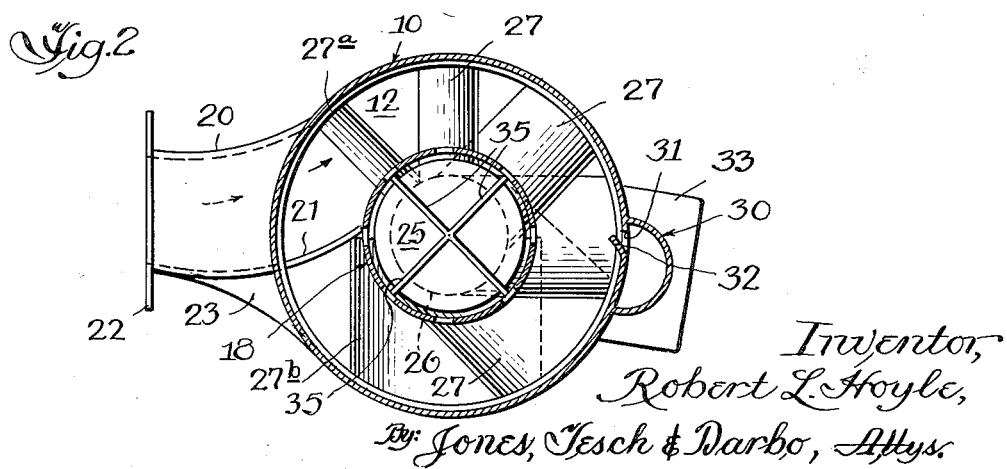

Fig. 1 is an elevation in partial section of an improved spark arrester snubber according to the invention, and Fig. 2 is a cross-sectional view taken at line 2—2 of Fig. 1.

Referring now in detail to an illustrative embodiment of the invention as shown in the drawing: The spark arrester snubber is comprised of a cylindrical shell 10. The inlet end of shell 10 is closed by an end closure plate or domed head 14 while the upper or outlet end of the shell is closed by a similar plate 15 having an exhaust aperture 16 therethrough. An open-ended exhaust tube 17 extends inwardly through aperture 16 a substantial distance into said shell and also projects outwardly from aperture 16 to surrounding space as a tail pipe. A multi-apertured tube 18 is provided as an extension to the inner end of tube 17 and extends coaxially with the shell a substantial portion of the length thereof stopping short of the spinner unit described hereinafter.

As illustrated, a side opening 19 is provided at the inlet end of shell 10 which may conveniently be made in two parts joined by a weld at 13. An inlet assembly including conduit means 20 is provided to direct the exhaust gases through aperture 19 and into the interior of shell 10, one side of the conduit extending through aperture 19 as a baffle plate 21 in such a manner that incoming gases are directed to one side of the axis of shell 10. The outer end of conduit means 20 is flanged, as at 22, for attachment, by suitable means, to the exhaust manifold of the engine. In normal operation the snubber is positioned vertically and supported by conduit means 20, with additional stability being given by lateral gusset 23.

According to the invention, means are provided for changing the direction of travel of the gases imposed by the inlet assembly into a spiraling whirl moving upwardly into the expansion chamber 11. As illustrated, a segmental spinner unit is located within spinner chamber 12. This spinner unit is comprised of a cylindrical supporting column 26 having a cap 25 at the top thereof, the column being located centrally in axial alignment with shell 10 adjacent inlet aperture 19. Column 26 may be positioned atop and suitably attached to lower head 14, as by welding or the like. Extending radially from supporting column 26 to the inner surface of shell 10 are a plurality of baffles or blades 27, attached along the edges thereof to column 26 and, if desired, to shell 10, by welding. Baffles 27 are spaced apart around column 26 and all terminate with their upper edges in a plane which may be taken as defining expansion chamber 11 and spinner chamber 12, while the lower edges of the baffles extend downwardly toward inlet end head 14 to a progressively increasing extent in the direction of air flow. The baffle 27a having the shortest length from upper to lower edge is positioned adjacent the inlet aperture 19 and is the first of the series to be reached by the inflowing stream of gases.

In the specific embodiment illustrated there are six baffles equispacially arranged about column 26 with each successive baffle increasing in length by an increment of approximately one-sixth of the length of the last and longest baffle 27b. The baffles are pitched at approximately 45° with the pitch of the baffles being so arranged that their lower edges face upstream whereby each successive baffle scoops off a layer of the gas stream and simultaneously changes its direction upwardly into the expansion chamber 11 as a whirling stream having a substantially spiral or helical form. In this way, gases are continuously removed from the inlet with no swirling body to impede the flow as in the operation of an ordinary tangential inlet.

Near the upper end of expansion chamber 11 adjacent head 15, means are provided for removing the entrained carbon particles. A collecting chamber or dust trap 30 is provided on the exterior of shell 10 which trap communicates with expansion chamber 11 by means of a vertical slot 31. These are preferably, but not necessarily, on the side of shell 10 remote from inlet aperture 19. Slot 31 extends lengthwise from outlet end closure 15 a limited portion of the vertical length of shell 10 making up chamber 11. Coextensive with slot 31 and attached at one edge thereof to shell 10 is a collecting lip 32 which projects angularly into chamber 11 in a direction opposed to the flow of the gases. It is so designed that the orifice comprised of slot 31 and lip 32 will accept all sizes of carbon particles normally found in diesel exhaust gases. The dust trap 30 terminates in a removable cap 33 which may be emptied periodically.

For the two-fold purpose of snubbing the pulsating flow of gases and to provide a core around which the gases in expansion chamber 11 whirl, an outlet tube 17 with a perforated extension 18 extends into the expansion chamber from aperture 16 in head 15. As shown, this tube is open-ended and is concentric with respect to the axis of shell 10, but it may, if desired be somewhat eccentric with shell 10, the distance between the tube and shell being greatest at slot 31. Straightening vanes 35 are arranged in the terminal portion of tube 18 and preferably extend to cap 25 of column 26 to which they may be welded for support and to provide stiffness for the entire internal structure.

Referring now to the detailed operation of the device: The pulsating exhaust gases of a diesel engine including entrained incandescent particles are introduced into the snubber by means of conduit 20 through inlet aperture 19 and directed into shell 10 entirely to one side of the axis thereof, a high circumferential component of velocity being imparted thereby. As the gases project into spinner chamber 12, the successive baffles 27 of the spinner unit serve to direct the stream upwardly in a tight spiraling whirl.

This high velocity stream flows into the expansion chamber 11 wherein it spins upwardly toward the top of this chamber. It is to be noted that the natural tendency of gases to expand in free space will cause the stream to expand inwardly as it progresses upwardly and eventually the gases escape from the expansion chamber into outlet tube 18 through the perforations therein or the open end thereof.

Meanwhile, solid particles entrained in the gas stream are thrown outwardly and expelled from the mass of flowing gases through slot 31 into trap 30. Once within the trap they fall by gravity and are collected within removable means 33.

The novel method of translating the directional flow of gases according to the present invention permits the operation of a side inlet snubber in a manner heretofore considered impractical for spark arrester snubbers of the character described. An important advantage of the present device is the almost complete absence of back pressure during the operation thereof. The trapping of entrained particles is practically complete while any small proportion of incandescent particles not removed are completely extinguished by mechanical impact against the inner cylindrical surface of the shell prior to ejection to the atmosphere. The gases, completely free of sparks are exhausted to the atmosphere in a relatively smooth, quiet stream.

Invention is claimed as follows:

1. In a spark arrester snubber having a cylindrical shell, inlet and outlet end closures for said shell, conduit means adjacent the inlet end thereof adapted to direct an incoming gaseous stream laterally into said shell on one side of the axis thereof, an open-ended outlet tube extending from the outlet end of said shell thereinto substantially coaxially with the axis of said shell, said shell having a slot therein extending lengthwise from the outlet end thereof opposite said outlet tube, and a dust trap exteriorly enclosing said slot; the improvement therein comprising a fixed segmental spinner unit having a cylindrical support member coaxial with said shell at the inlet end thereof and a series of pitched blades circumferentially spaced around said support member and extending radially therefrom to the inner surface of said shell, said blades being spaced from said inlet end closure and each successive blade in the direction of flow of the gaseous stream extending progressively farther toward the inlet end of said shell and being so arranged that it imparts a longitudinal component of flow to a portion of said incoming gaseous stream.

2. A spark arrester snubber comprising a cylindrical shell having inlet and outlet end closures, conduit means adjacent the inlet end thereof for directing an incoming gaseous stream laterally in said shell on one side of the axis thereof, a fixed segmental spinner unit arranged within said shell at the inlet end thereof to receive the incoming gaseous stream, said unit comprising a cylindrical support coaxial with said shell and a series of pitched blades spaced from said inlet end closure and circumferentially spaced around said support and extending radially therefrom to the inner surface of said shell and extending progressively farther toward the inlet end of the shell and into the gaseous stream in the direction of flow thereof, an open-ended outlet tube extending into said shell from the outlet end thereof and terminating short of said spinner unit, said tube being arranged substantially concentrically with respect to the axis of said shell and having at least the end portion thereof within said shell perforated, vanes within at least the end portion of said tube parallel with the axis thereof and extending beyond the end of said tube, said shell having a slot therein extending lengthwise a limited distance from the outlet end thereof, and a dust trap exteriorly enclosing said slot.

3. In a spark arrester having a cylindrical shell, inlet and outlet end closures for said shell, conduit means adjacent the inlet end thereof adapted to direct an incoming gaseous stream laterally into said shell on one side of the axis thereof, means for the egress of gases at the outlet end of said shell, and means associated with said shell near the outlet end thereof for trapping and removing solid particles from entrainment with the gases, the improvement therein consisting of improved means for turning said incoming gas stream to cause the same to follow an helical course through said shell, said improved means comprising a fixed segmental spinner unit having a cylindrical support member coaxial with said shell at the inlet end thereof and a series of pitched blades circumferentially spaced around said support member and extending radially therefrom to the inner surface of said shell, said blades being spaced from said inlet end closure and each successive blade in the direction of flow of the gaseous stream extending progressively farther toward the inlet end of said shell and being so arranged that it imparts a longitudinal component of flow to a portion of said incoming gaseous stream.

References Cited in the file of this patent

UNITED STATES PATENTS

| Number | Name | Date |
|---|---|---|
| 756,537 | Simonds | Apr. 5, 1904 |
| 1,715,549 | Hawley | June 4, 1929 |
| 1,739,014 | Parker | Dec. 10, 1929 |
| 2,299,332 | Marshall | Oct. 20, 1942 |
| 2,329,101 | Chipley | Sept. 7, 1943 |
| 2,480,379 | Newberry | Aug. 30, 1949 |
| 2,511,713 | Hoyle et al. | June 13, 1950 |

FOREIGN PATENTS

| 374,382 | Great Britain | June 9, 1932 |